Dec. 23, 1958
M. E. BOURNS
2,866,053
COMBINED POTENTIOMETER AND READ-OUT CONSTRUCTIONS
Filed Jan. 30, 1956
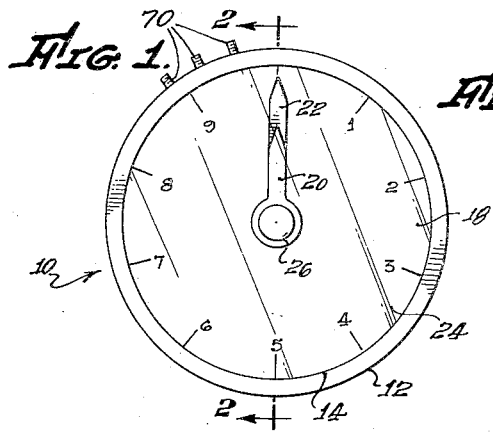
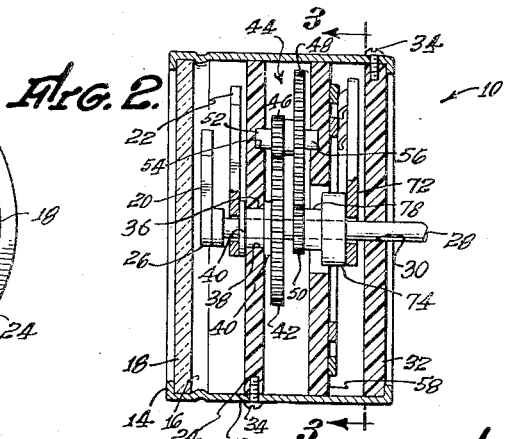
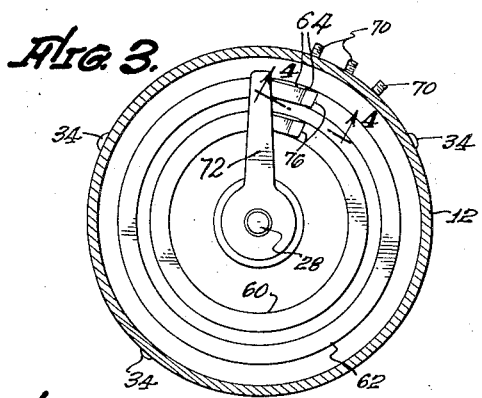
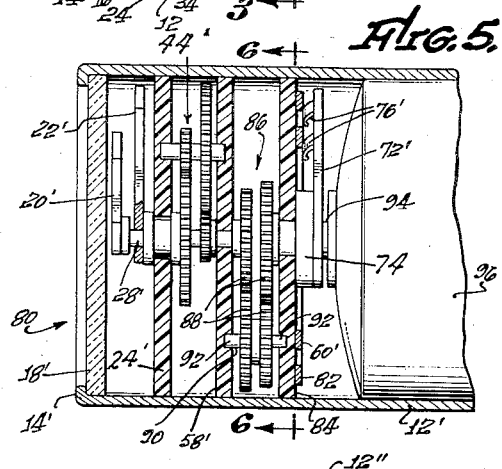
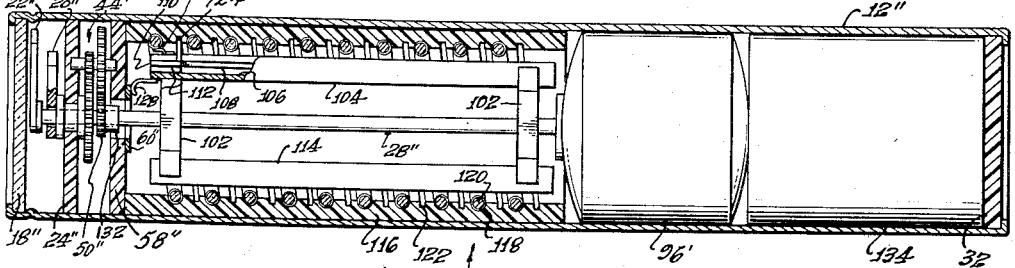
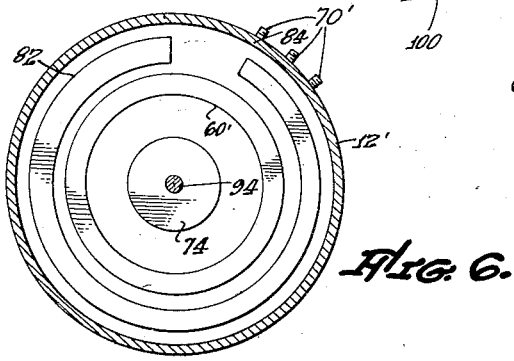
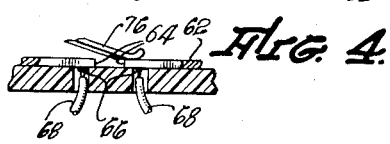
INVENTOR.
BY *Marlan E. Bourns*
*Edd D. O'Brien*
ATTORNEY.

United States Patent Office 2,866,053
Patented Dec. 23, 1958

2,866,053
COMBINED POTENTIOMETER AND READ-OUT CONSTRUCTIONS

Marlan E. Bourns, Riverside, Calif.

Application January 30, 1956, Serial No. 562,088

3 Claims. (Cl. 201—48)

This invention relates to new combined potentiometer and read-out constructions.

For many years there has been a definite need for compact, highly accurate meters which can be used in reading voltage ratio, resistance ratio, etc., by indicating the relative position of a wiper upon a potentiometer. The need for such constructions has been so pronounced in the industry that it can almost be stated with complete accuracy that meters of this category have not been available.

Frequently rather expensive, large size laboratory meters of a conventional construction have been utilized with a potentiometer to read voltage or resistance ratio. These meters are of normally relatively limited accuracy of the order of from $\frac{1}{4}$ to $\frac{1}{2}\%$. Further, they are limited because of parallax involved in reading them, and they require a mirror scale and exceedingly accurate reading in order to obtain satisfactory results, even if the meter movement employed is accurate. Further, these large, conventional meters are easily damaged and frequently have to be specially calibrated in order for satisfactory accuracy to be obtained.

It has been found in accordance with this invention that it is possible to incorporate read-out devices with rotary potentiometers in order to obtain small lightweight, comparatively rugged constructions which can be easily and conveniently used to read such quantities as voltage or resistance ratio with high accuracy. It may be stated that a broad general object of the invention is to provide constructions such as are briefly indicated in the preceding sentence.

Because of the nature of this invention, it is not considered necessary to set forth in this patent specification a lengthy list of objects and advantages. Such objects and advantages will be realized by those skilled in the art to which this invention pertains from a consideration of the remainder of this description, together with the appended claims and the accompanying drawings in which:

Fig. 1 is a front plan view of a combined potentiometer and read-out device of this invention;

Fig. 2 is a cross sectional view taken at line 2—2 of Fig. 1;

Fig. 3 is a cross sectional view taken at line 3—3 of Fig. 2;

Fig. 4 is a partial cross sectional view taken at line 4—4 of Fig. 3;

Fig. 5 is a cross sectional view similar to Fig. 2 of a modified construction of the present invention, utilizing as an integral part of this construction a small electric motor to actuate the potentiometer involved;

Fif. 6 is a cross sectional view taken at line 6—6 of Fig. 5 of the drawings; and Fig. 7 is a sectional view similar to Fig. 2 of a second modified construction of this invention, this modified construction including in addition to a potentiometer and a read-out device, an electric motor and an amplifier, the functions of which will be more fully explained later.

In all figures of the drawing, like numerals are used to designate like parts wherever convenient for purposes of illustration and explanation. It is to be understod that this invention is not limited to constructions manufactured precisely as shown in the drawing, inasmuch as the broad principles of this invention can be applied to a number of distinct, different types of units which represent a departure from the constructions illustrated.

It may be stated, by way of summary, that this invention is primarily concerned with new combined potentiometer and read-out constructions, each of which includes: a housing; a rotatable shaft positioned within said housing; an arcuate resistance element disposed about said shaft within said housing, so that said shaft is centrally located with respect to said resistance element; a contact arm secured to said shaft, said contact arm having formed thereon resilient contact means engaging said resistance element; a dial located about said shaft within said housing, said dial having formed thereon a plurality of graduations; and at least one hand connected to said shaft within said housing adjacent to said graduations on said dial whereby as said shaft is turned, said contact arm is moved with respect to said resistance element and said hand is moved with respect to said dial so that the position of said contact arm with respect to said resistance element may be visually determined by viewing the position of said hand with respect to said dial. It will be realized that this summary, in some respects, is overly simplified. It is given primarily so as to aid in an understanding of the various small, compact constructions of the invention hereinafter set forth. This invention is more fully defined or summarized by the appended claims forming a part of the specification.

In Fig. 1 of the drawings there are shown a combined potentiometer and read-out construction 10 of the invention. This construction or device is built generally within a tubular steel housing 12. Within one end of this housing there is held between a flange 14 and an annular internal groove 16 a glass plate 18 which is employed so that the position of hands 20 and 22 with respect to a graduated dial 24 may be visually determined.

The hand 20 is secured to a cap 26 upon an end of a rotatable shaft 28 which projects from adjacent to the glass plate 18 out through the other end of the housing 12 where it projects through an aperture 30 within a non-conductive closure plate 32 secured as by screws 34 to the housing 12. The shaft 28 is also supported within the construction 10 within a rotatable spool 36 disposed about the shaft; the spool 36 is, in turn, rotatably held within an aperture 38 in the dial 24. The ends 40 of the spool 36 engage the front and back surfaces of the dial 24 so as to prevent lateral shifting of the spool upon the shaft 28. The hand 22 is secured as by conventional means such as solder to one of the ends 40 of the spool so as to project therefrom; to the other end of the spool there is secured a large gear 42 which forms part of a gear train 44 composed of this gear 42, a small gear 46, another large gear 48 and a second small gear 50. The small gears 46 and 50 are preferably of the same size; and the large gears 42 and 48 are preferably of the same dimension. Further, the gears 46 and 48 are secured together upon a shaft 52 which is rotatably held within an aperture 54 in the dial 24 and within another similar aperture 56 in a non-conductive disc-shaped plate 58.

This plate 58 and the dial 24 are preferably secured within the housing 12 by means of screws 34 in a similar manner to the means by which the closure plate 32 is secured within this housing. All three of these plates, as well as the last plate 18, are located in planes perpendicular to the axis of the housing 12 and of the shaft 28. Upon the non-conductive plate 58 there is disposed, as shown in Fig. 3 of the drawing, a ring-shaped electrical return 60 such as may be conveniently formed by conventional printed circuit techniques. Located concentrically around this return 60 is an arcuate resistance element 62 located in a plane perpendicular to the axis of the shaft 28 such as may also be conveniently formed by printed circuit techniques. This resistance element extends substantially, but slightly less than, 360° around the shaft 28 so that, if desired, it, together with other means as herein described, form what in effect is part of a rotary potentiometer capable of substantially 360° rotation. The ends 64 of the resistance element 62 are connected by means of small inserts 66 to wires 68 leading to terminals 70 disposed so as to project through the exterior of the housing 12. A similar insert 66 is employed to connect another wire 68 to another terminal 70 so as to connect the return 60 into an electrical circuit.

Electrical communication between the return 60 and the element 62 is established within the device 10 by means of a contact arm 72 formed of a conductive metal so as to project from a non-conductive bushing 74 secured about the shaft 28. This arm 72 is secured to the bushing 74 so as to be spaced from the shaft 28; further, it includes resilient contact members 76 which engage the resistance element 62 and the return 60. Shaft rotation is transmitted to the gear 50 of the gear train 44 by virtue of this gear 50 being attached to a small collar 78 which is directly secured to the shaft 28 adjacent to the bushing 74.

The operation of device 10 is exceedingly simple. As the shaft 28 is turned the contact arm will be moved in essentially the obvious manner adjusting what amounts to a complete potentiometer. Further, this motion will be transmitted directly to the short hand 20 turning this hand with respect to the dial 24, and the position of the long hand 22 will be adjusted through the actuation of the gear train 44. The relative position of the contact arm 72 may then be directly determined by inspecting the location of these two hands 20 and 22 much in the manner in which the common clock is read. Great accuracy is possible with this reading because of the fact that several hands are used in conjunction with the graduated dial 24. It is preferred that the graduations on this dial and that the gear train 44 be constructed so that the reading obtained can be three digits based upon the number 10.

In Fig. 5 of the drawings there is shown a modified combined potentiometer and read-out construction 80 of the invention which is very similar to the device 10 previously described, except that an arcuate resistance element 82 of less than 360° of a circle is substituted for the resistance element 62 previously described. This resistance element 82, together with an electrical return 60' are disposed upon a plate 84 in the same manner in which the resistance element 62 of the return 60 were disposed upon the plate 58. This plate 84 is spaced from a plate 58' in the device 80 so as to accommodate a gear train 86 similar to the gear train 44 previously described. This gear train 86 is employed to convert shaft rotation corresponding to the number of degrees of a circle of the length of resistance element 82 to rotation of the shaft 28' equal to 360° of a circle. The gear train 86 is composed of four gears 88, two of which are held upon a shaft 90 disposed between apertures 92 in the plates 84 and 58', and the other two of which are secured to the shaft 28' and another shaft 94. Within the device 80 the shaft 94 projects from a small servo motor 96 located within the housing 12'. Further, to this shaft 94 a non-conductive bushing 74 is secured; and a contact arm 72' having contact members 76' is secured to the bushing 74.

The modified device 80 is exceedingly efficient in many applications inasmuch as the motor used to actuate this device carries a shaft which serves to adjust what, in the device 80, amounts to a complete potentiometer. Further, this shaft is used to directly actuate the means forming the read-out part of this construction. This eliminates troubles normally attendant with various mechanical linkages, etc., and materially lessens the friction involved. With the device 80 gear means have been employed so that the hands 20 and 22' used will rotate throughout 360° of a circle about the shaft 28' when the contact members 76' are moved from one end of the resistance element 82 to the other end of this resistance element. It is possible to dispense with the intermediate gear train 86 so that these hands 20' and 22' do not move this complete amount, although this is not preferred.

With the device 80 the resistance element 82 is shown as being of a non-linear category. This type of construction is quite advantageous for many purposes inasmuch as when a non-linear quantity as might be obtained from an air speed reading or the like is fed to the device 80 through the terminals 70', the dial 24' need not be graduated in a non-linear manner. This non-linear construction can also be used with the device 10 if desired. It is to be understood that the invention is not limited to printed circuit linear or non-linear resistance elements inasmuch as either linear or non-linear wire wound or other resistance elements can be employed instead of those shown by merely locating such elements in appropriate, obvious manner within either of these devices. A motor such as the motor 96 can be employed within the housing 12 in the device 10.

In Fig. 7 of the drawing, there is shown a second modified combined potentiometer and read-out device or construction 100 of this invention. This device 100 employs a housing 12" as previously described within one end of which there is held a glass plate 18" so that hands 20" and 22" can be viewed against the dial 24". Within this construction the long hand 22" is attached directly to a shaft 28" which projects from a motor 96'. This shaft is also directly attached to non-conductive cross arms 102, the ends of which are formed as yokes. An elongated bar 104 within the center of which there is disposed an elongated slot 106 is held within two of these yokes. Upon the sides of the slot 106 there are disposed guide rails 108 which are adapted to fit within corresponding slots 110 in a movable member 112. On the other ends of the cross arms 102 there is held in the same manner a bar 114 serving as a counterweight.

Around the outside of the bars 104 and 114 within the housing 12" there is located a non-conductive cylinder 116 having formed on the inside thereof a continuous groove 118 within which there is disposed a helical wound resistance element 120. Those skilled in the art to which the invention pertains will realize that a resistance element of this type may be considered an arcuate resistance element since it extends in an arcuate curved path around a shaft. There is also located within the cylinder 116 another groove 122 corresponding in pitch to the groove 118. Upon the movable member 112 there is located a small projection 124 which fits within this other groove 122 so that as the shaft 28" is turned the movable member is rotated and is caused to move along the length of the slot 106. Upon this movable member 112 there is disposed a small resilient metal contact member 126 which continuously engages the resistance element 120 during the motion described. The movable member 112 and the bar 104 are preferably formed of a conductive metal so that current is transmitted during the operation of the device 100 from the resistance element 120 through the contact member 126 to the movable member 112 and thence to the bar 104 and to a contact arm 128 secured to the bar 104 so as to be in electrical engagement with an electrical return 60" disposed upon a plate 58". Terminals 70" are employed as previously indicated.

Located upon the shaft 28" is a small collar 132 which supports a gear 50" of a gear train 44" serving to turn the short hand 20 in the general manner previously indicated. It is readily seen from the above description that the device 100 differs from the two constructions previously described in that a multi-turn or helical potentiometer is employed instead of a single turn or less than a single turn rotary potentiometer. Because of this, the arrangement of the hands 20″ and 22″ has, in effect, been reversed so that the long hand 22″ is connected directly to the shaft 58″.

The motor 96′ employed in the construction shown in Fig. 7 is actuated by a small cylindrical amplifier 134 disposed within the housing 12″. An amplifier such as the type that may be employed in the invention is shown in the Carl N. Boode application, Serial No. 542,135, filed October 24, 1955, and entitled Servo Amplifier.

The advantages of the construction shown in Fig. 7 should be essentially obvious to those familiar with the field to which this invention pertains. Because both amplifier and motor are disposed within a single housing in a compact manner along with a combined potentiometer and read-out device there is little danger of damaging any of the individual components of this combined construction due to handling. Further, the entire assembly can be sold as one single unit, and can be readily mounted as a single unit in virtually any location. The cylindrical housing employed serves to protect all of the parts involved against damage such as might arise from rough handling or the like.

It is obviously possible to modify the constructions shown in a number of manners other than those which have been specifically indicated in the preceding discussion. The basic principles of this invention can be applied to five or other number of turn helical potentiometers. Further, other amplifiers than those shown indicated can be employed and amplifiers can be disposed in the same housing with the types of constructions illustrated in Figs. 1 and 5 of the drawing. All such modifications of this category, insofar as they are in the skill of the art, are to be considered as part of the inventive concept. Because of the large number of possible modifications in the structures shown without departing from the essential features of this invention, the invention is to be considered as being limited only by the appended claims.

I claim:

1. A combined potentiometer and read-out construction which comprises: a housing having an end; a rotatable shaft positioned within said housing so as to project therefrom; a glass plate secured within said end of said housing; a dial secured within said housing so as to be spaced from said glass plate; means defining a central opening within said dial, said shaft extending through said opening in said dial; a first hand secured to said shaft between said dial and said glass plate; a non-conductive plate having a central opening formed therein positioned within said housing with said shaft passing through said central opening in said plate, said non-conductive plate being spaced from said dial and secured to said housing; an arcuate resistance element located upon said non-conductive plate around said shaft; a ring shaped electrical return located upon said non-conductive plate around said shaft; a conductive contact arm secured to said shaft so as to rotate therewith, said contact arm being insulated from said shaft and including resilient contact members engaging said resistance element and said return; a second hand rotatably mounted with respect to said shaft, said second hand being located between said glass plate and said dial; and gear means connected to said second hand and said shaft for rotating said second hand at a different rate from said first hand, said gear means including a gear train mounted between said dial and said plate.

2. A combined potentiometer and read-out construction which comprises: a housing having an end; a rotatable first shaft positioned within said housing; a transparent plate secured within said end of said housing; a dial secured within said housing so as to be spaced from said transparent plate; a first hand secured to said first shaft between said transparent plate and said dial; a second hand rotatably mounted around said first hand between said transparent plate and said dial; gear means attached to said first shaft and said second hand for rotating said second hand at a different speed from said first hand; a second shaft rotatably mounted within said housing; gear means attached to said first and said second shafts for rotating said first shaft at a different speed from said second shaft; an arcuate resistance element located around said second shaft; a ring shaped electrical return located around said second shaft; and a contact arm secured to said second shaft so as to project therefrom, said contact arm including resilient means engaging said resistance element and said return.

3. A construction as defined in claim 2 including: an electrical motor positioned within said housing and wherein said second shaft projects from said motor.

References Cited in the file of this patent

UNITED STATES PATENTS

| | | |
|---|---|---|
| 2,120,100 | Illgen | June 7, 1938 |
| 2,519,752 | Fox | Aug. 22, 1950 |
| 2,539,575 | George | Jan. 30, 1951 |
| 2,690,488 | Parkinson | Sept. 28, 1954 |